US012452575B2

(12) United States Patent
Park et al.

(10) Patent No.: US 12,452,575 B2

(45) Date of Patent: Oct. 21, 2025

(54) WEARABLE DEVICE

(71) Applicant: Samsung Electronics Co., Ltd., Suwon-si (KR)

(72) Inventors: Sunghwa Park, Suwon-si (KR); Kiwook Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 385 days.

(21) Appl. No.: 18/148,032

(22) Filed: Dec. 29, 2022

(65) Prior Publication Data

US 2023/0217152 A1 Jul. 6, 2023

Related U.S. Application Data

(63) Continuation of application No. PCT/KR2022/021544, filed on Dec. 28, 2022.

(30) Foreign Application Priority Data

Dec. 31, 2021 (KR) ........................ 10-2021-0194172
Mar. 3, 2022 (KR) ........................ 10-2022-0027687

(51) Int. Cl.

*H04R 1/10* (2006.01)
*H04R 1/08* (2006.01)
*H04R 1/34* (2006.01)

(52) U.S. Cl.

CPC ........... *H04R 1/1075* (2013.01); *H04R 1/083* (2013.01); *H04R 1/342* (2013.01)

(58) Field of Classification Search

CPC .... H04R 1/083; H04R 1/1016; H04R 1/1075; H04R 1/1083; H04R 1/342; H04R 2410/05; H04R 2460/01; H04R 2420/07; H04R 25/604; H04R 25/652

See application file for complete search history.

(56) References Cited

U.S. PATENT DOCUMENTS

| | | | |
|---|---|---|---|
| 5,909,498 | A | 6/1999 | Smith |
| 2010/0142726 | A1 | 6/2010 | Donaldson |
| 2012/0314882 | A1 | 12/2012 | Sibbald |

(Continued)

FOREIGN PATENT DOCUMENTS

| | | |
|---|---|---|
| KR | 10-2020-0091684 A | 7/2020 |
| KR | 10-2021-0101597 A | 8/2021 |

(Continued)

OTHER PUBLICATIONS

Extended European Search Report dated Dec. 4, 2024, issued in European Application No. 22916764.8-1207.

(Continued)

*Primary Examiner* — Kile O Blair

(74) *Attorney, Agent, or Firm* — Jefferson IP Law, LLP

(57) ABSTRACT

According to various embodiments of the disclosure, an electronic device may includes a housing, a speaker module disposed inside the housing, a microphone module disposed inside the housing, and a support member including a speaker hole, a speaker support section having the speaker module disposed on a first surface thereof, and a microphone support section having the microphone module disposed on a second surface thereof opposite to the first surface. The microphone module may be disposed to be spaced apart from the speaker hole.

14 Claims, 12 Drawing Sheets

(56) References Cited

U.S. PATENT DOCUMENTS

| | | | |
|---|---|---|---|
| 2017/0318401 A1 | 11/2017 | Chang et al. | |
| 2019/0069104 A1 | 2/2019 | Lindberg | |
| 2020/0374621 A1 | 11/2020 | Huang | |
| 2021/0195310 A1 | 6/2021 | Kim et al. | |
| 2021/0250676 A1 | 8/2021 | Kim et al. | |
| 2021/0289280 A1 | 9/2021 | Ko et al. | |
| 2021/0345033 A1 | 11/2021 | Yu et al. | |
| 2022/0007097 A1 | 1/2022 | Ko et al. | |
| 2022/0014832 A1* | 1/2022 | Seo | H04R 1/08 |
| 2022/0248126 A1 | 8/2022 | Hasegawa | |

FOREIGN PATENT DOCUMENTS

| | | |
|---|---|---|
| KR | 10-2287938 B1 | 8/2021 |
| KR | 10-2292933 B1 | 8/2021 |
| KR | 10-2312003 B1 | 10/2021 |
| KR | 10-2312004 B1 | 10/2021 |
| KR | 10-2312005 B1 | 10/2021 |
| KR | 10-2602372 B1 | 11/2023 |
| WO | 2020-255596 A1 | 12/2020 |

OTHER PUBLICATIONS

International Search Report dated Apr. 3, 2023, issued in International Patent Application No. PCT/KR2022/021544.

* cited by examiner

WEARABLE DEVICE

CROSS-REFERENCE TO RELATED APPLICATION(S)

This application is a continuation application, claiming priority under § 365(c), of an International application No. PCT/KR2022/021544, filed on Dec. 28, 2022, which is based on and claims the benefit of a Korean patent application number 10-2021-0194172, filed on Dec. 31, 2021, in the Korean Intellectual Property Office, and of a Korean patent application number 10-2022-0027687, filed on Mar. 3, 2022, in the Korean Intellectual Property Office, the disclosure of each of which is incorporated by reference herein in its entirety.

TECHNICAL FIELD

Various embodiments of the disclosure relate to a wearable device worn on an ear.

BACKGROUND ART

Portable electronic devices, such as smartphones and tablet personal computers (PCs) have been developed to be wearable on a user's body, for improved user mobility and accessibility. For example, more and more users use wearable devices worn on the wrist, head, or ears.

For example, among wearable devices worn on a user's body, a wearable device wearable on the ear may provide convenience during music play, call origination and termination, and call commands. Such a wearable device may include an active noise cancellation (ANC) function to cancel ambient noise.

DISCLOSURE

Technical Problem

In a general electronic device, the area of a conduit is large or a microphone is small, so that the microphone may be inserted into the conduit. However, the conduit becomes smaller for an enhanced feeling of wearability and aesthetics, and the microphone becomes larger due to use of a high-performance microphone over the recent years. Therefore, when the microphone is disposed in the conduit, the microphone may occupy most of the space inside the conduit due to the decreased size of the conduit and the increased size of the microphone, thereby degrading audio performance. In view of the limited internal space of the conduit, a sound reception path into the microphone and a sound output path from a speaker may not be configured differently, and thus audio (e.g., microphone) performance, for example, the ANC function may be deteriorated.

According to various embodiments of the disclosure, the overall thickness of an electronic device may be reduced by using a minimal structure through integration of a microphone support section and a speaker support section. Further, audio performance may be increased by securing a conduit opening ratio. However, the problems to be solved in the disclosure are not limited to the above-mentioned problems, and may be variously extended without departing from the spirit and scope of the disclosure.

Technical Solution

According to various embodiments of the disclosure, an electronic device may include a housing, a speaker module disposed inside the housing, a microphone module disposed inside the housing, and a support member including a speaker hole, a speaker support section having the speaker module disposed on a first surface thereof, and a microphone support section having the microphone module disposed on a second surface thereof opposite to the first surface. The microphone module may be disposed to be spaced apart from the speaker hole.

According to various embodiments of the disclosure, an electronic device may include a housing, a speaker module disposed inside the housing and formed to output a sound in a first direction, a microphone module disposed inside the housing and formed to receive a sound in a fourth direction perpendicular to the first direction, and a support member including a speaker hole, a speaker support section having the speaker module disposed on a first surface thereof, a microphone support section having the microphone module disposed on a second surface thereof opposite to the first surface, and a coupling section coupling the speaker support section and the microphone support section to each other. The microphone support section may be disposed to be spaced apart from the speaker hole.

Advantageous Effects

According to various embodiments of the disclosure, the overall thickness of an electronic device may be reduced by using a minimal structure through integration of a microphone support section and a speaker support section. Further, audio performance may be improved by securing a conduit opening ratio. Further, sound leakage into a microphone may be reduced.

According to various embodiments of the disclosure, a microphone module may be disposed at a location spaced apart from a speaker module and/or a conduit. For example, the microphone module may be disposed at a position that does not interfere with a space in which the conduit is disposed. As the microphone module is spaced apart from the conduit, it may secure a conduit opening ratio and prevent degradation of audio performance.

According to various embodiments of the disclosure, the microphone module may form a sound reception path on a side surface along a path inside a duct formed on the side surface. For example, a sound output path of the speaker module and the sound reception path of the microphone module may be different. When the sound reception path through which an external sound enters a microphone is different from the sound output path of a speaker, the probability of a sound output from the speaker entering the microphone module is low. Accordingly, an active noise cancellation (ANC) function and a mid- and high-pitched range using function may be improved.

MODE FOR INVENTION

Figure 1:
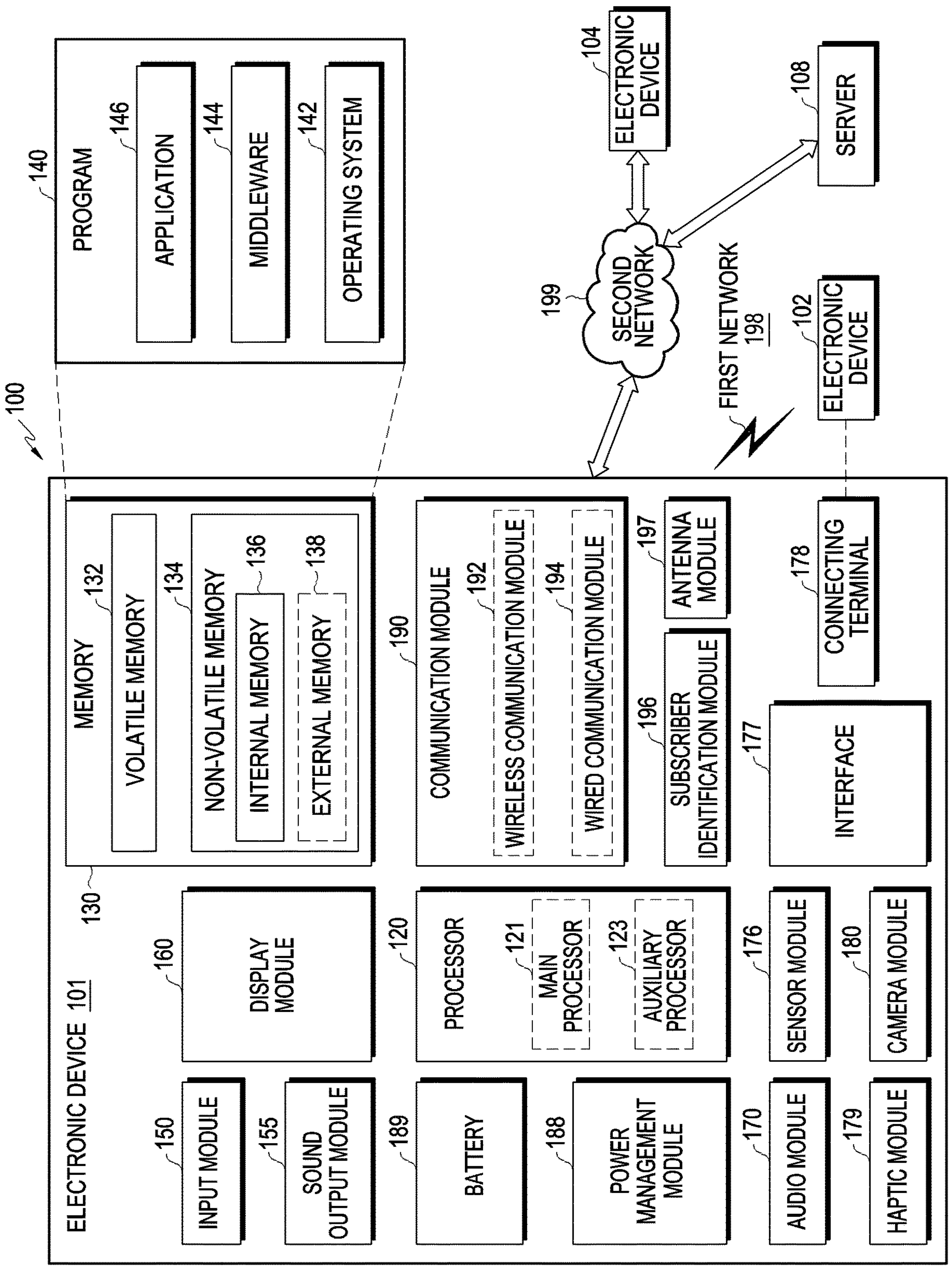
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a $5^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
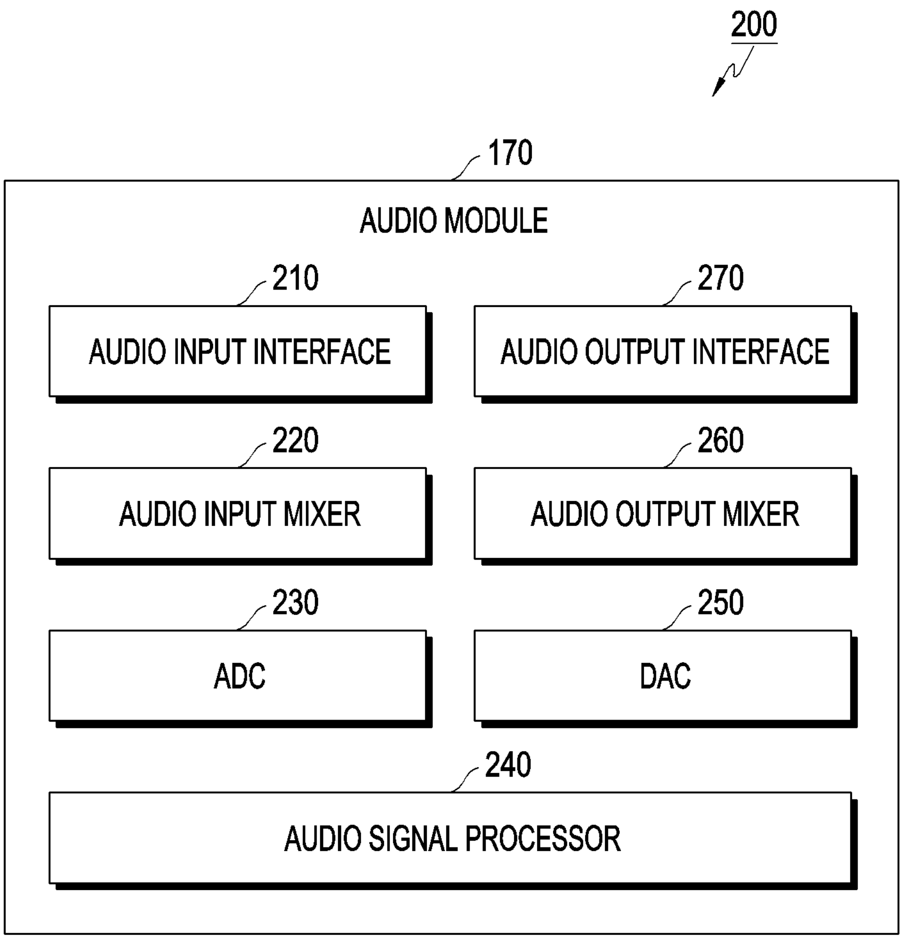
FIG. 2 is a block diagram illustrating an audio module according to an embodiment of the disclosure.

FIG. 2 is a block diagram 200 illustrating an audio module according to an embodiment of the disclosure.

Referring to FIG. 2, the audio module 170 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be coupled to the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130) of the electronic device 101.

The audio input mixer 220 may synthesize a plurality of input audio signals into at least one audio signal. For example, according to an embodiment, the audio input mixer 220 may synthesize a plurality of analog audio signals input via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be output, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal input via the audio input interface 210 or an audio signal that is to be output via the audio output interface 270. According to an embodiment, the audio amplifier may be configured as a module separate from the audio module 170.

Figure 3A:
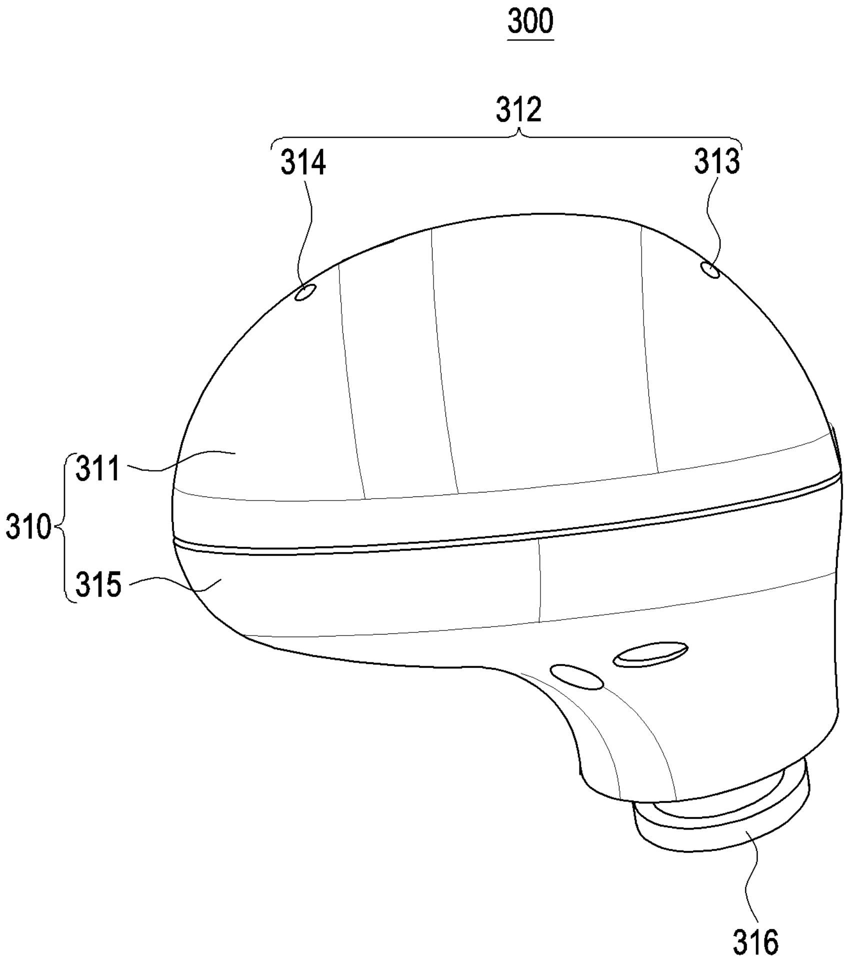
FIG. 3A is a side view illustrating an electronic device according to an embodiment of the disclosure.

FIG. 3A is a side view illustrating an electronic device according to an embodiment of the disclosure.

Figure 3B:
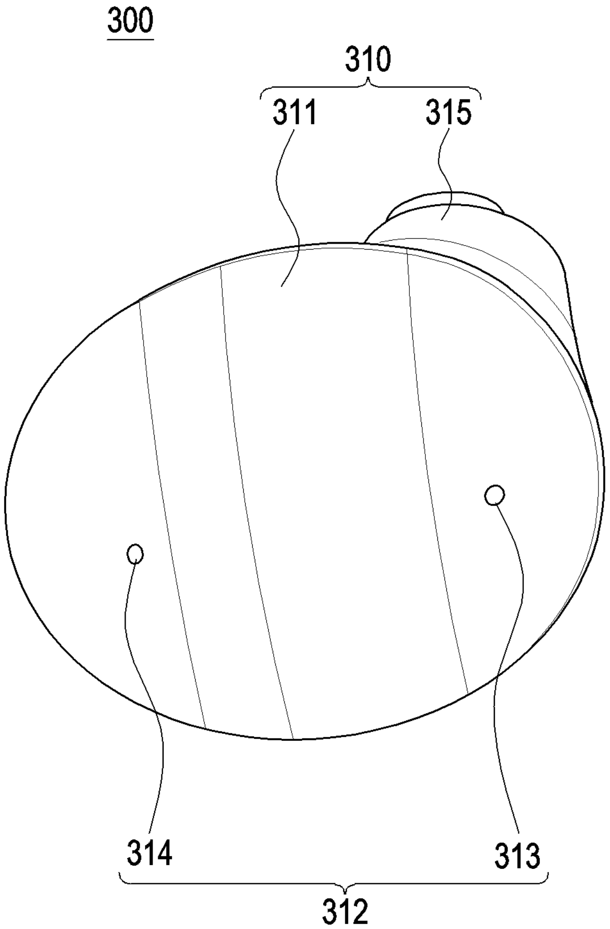
FIG. 3B is a top view illustrating an electronic device according to an embodiment of the disclosure.

FIG. 3B is a top view illustrating an electronic device according to an embodiment of the disclosure.

Referring to FIGS. 3A and 3B, the electronic device 300 may include a housing 310 for accommodating components of the electronic device 300. For example, acoustic components (e.g., the audio module 170 of FIG. 2) and electronic components (e.g., the processor 120, the power management module 188, the battery 189, or the wireless communication module 192 of FIG. 1) may be disposed in the housing 310. The configuration of the electronic device 300 illustrated in FIGS. 3A and 3B may be substantially the same as all or part of the configuration of the electronic device 101 illustrated in FIG. 1.

According to various embodiments, the electronic device 300 may include a wearable electronic device. For example, the electronic device 300 may be worn on a body part, for example, an ear or a head. According to an embodiment, the electronic device 300 may include an in-ear earset, an in-ear headset, or a hearing aid.

According to various embodiments, as illustrated in FIGS. 3A and 3B, the electronic device 300 may be asymmetrical in shape. According to an embodiment, since the electronic device 300 is formed to have an asymmetric shape, the electronic device 300 may be ergonomically designed, and user convenience may be increased. According to an embodiment, as the electronic device 300 is formed to have an asymmetric shape, the acoustic components (e.g., the audio module 170 of FIG. 2) and electronic components (e.g., the processor 120 of FIG. 1) inside the housing 310 may be arranged in such a manner that improves acoustic performance.

According to various embodiments, the electronic device 300 may be electrically coupled to an external electronic device (e.g., the external electronic device 102 of FIG. 1). According to an embodiment, the electronic device 300 may function as an audio output interface (or, for example, the sound output module 155 of FIG. 1) that outputs a sound signal received from the external electronic device 102 to the outside.

Additionally or alternatively, the electronic device 300 of the disclosure may function as an audio input interface (or the input module 150 of FIG. 1) for receiving an audio signal corresponding to a sound obtained from the outside of the electronic device 300.

According to an embodiment, the electronic device 300 may communicate with and/or be controlled by the external electronic device 102. The electronic device 300 may be an interactive electronic device which is paired with the external electronic device, such as a smartphone through a communication method, such as Bluetooth, and converts data received from the external electronic device 102 to output a sound or receives a user voice and transmits the user voice to the external electronic device 102.

According to an embodiment, the electronic device 300 may be wirelessly coupled to the external electronic device 102. For example, the electronic device 300 may communicate with the external electronic device 102 through a network (e.g., a short-range wireless communication network or a long-range wireless communication network). The network may include, but not limited to, a mobile or cellular communication network, a local area network (LAN) (e.g., Bluetooth communication), a wireless local area network (WLAN), a wide area network (WAN), the Internet, or a small area network (SAN). According to an embodiment, the electronic device 300 may be coupled to the external electronic device 102 wiredly by a cable (not shown).

According to another embodiment, the electronic device 300 may not communicate with the external electronic device 102. In this case, the electronic device 300 may be implemented to receive a signal corresponding to a sound obtained from the outside according to operations (or control) of components included in the electronic device 300, without being controlled by the external electronic device 102. For example, the electronic device 300 may be a stand-alone electronic device which autonomously plays music or a video without communicating with the external electronic device 102 and outputs a corresponding sound or receives and processes a user voice.

In various drawings of the disclosure, a kernel-type in-ear earset to be mounted mainly on an outside part of a user's ear from a pinna to an eardrum may be described as an example of the electronic device 300. However, it should be noted that the disclosure is not limited thereto. According to another embodiment, while not shown in the drawings, the electronic device 300 may bet an open-type earphone to be mounted on the pinna.

According to various embodiments, the housing 310 may include a plurality of components. For example, the housing 310 may include a first housing 311 and a second housing 315 coupled to the first housing 311. According to an embodiment, the first housing 311 and the second housing 315 may form at least part of the exterior of the electronic device 300 and form an internal space in which components of the electronic device 300 are accommodated. According to an embodiment, with the electronic device 300 worn on the user, at least part of the second housing 315 may contact or face the user's body (e.g., an ear), and at least part of the first housing 311 may face in a direction opposite to the user.

According to various embodiments, the housing 310 may include a microphone hole 312. According to an embodiment, the microphone hole 312 may be interpreted as a through hole formed in the first housing 311. According to an embodiment, an external sound of the electronic device 300 may be transmitted to a microphone module (e.g., a microphone module 330 of FIG. 4) located inside the electronic device 300 through the microphone hole 312. According to an embodiment, the microphone hole 312 may include a plurality of microphone holes 313 and 314. For example, the microphone hole 312 may include a first microphone hole 313 and/or a second microphone hole 314 spaced apart from the first microphone hole 313.

According to various embodiments, the housing 310 may include a protrusion 316. According to an embodiment, at least part of the protrusion 316 may be inserted into the user's body (e.g., the ear). For example, the electronic device 300 may be inserted and mounted in the user's body (e.g., an external ear or the pinna of the body) using the protrusion 316. According to an embodiment, the protrusion 316 may be interpreted as part of the housing 310 extending from the second housing 315. According to an embodiment, an ear tip (not shown) may be additionally mounted on the protrusion 316, and the electronic device 300 may be brought into close contact with the user's ear using the ear tip. According to an embodiment, the protrusion 316 may include at least one recess (not shown), and a sound output from a speaker module (e.g., the audio module 170 of FIG. 2) disposed inside the electronic device 300 may be radiated to the outside of the electronic device 300, using the recess located in the protrusion 316.

Figure 4:
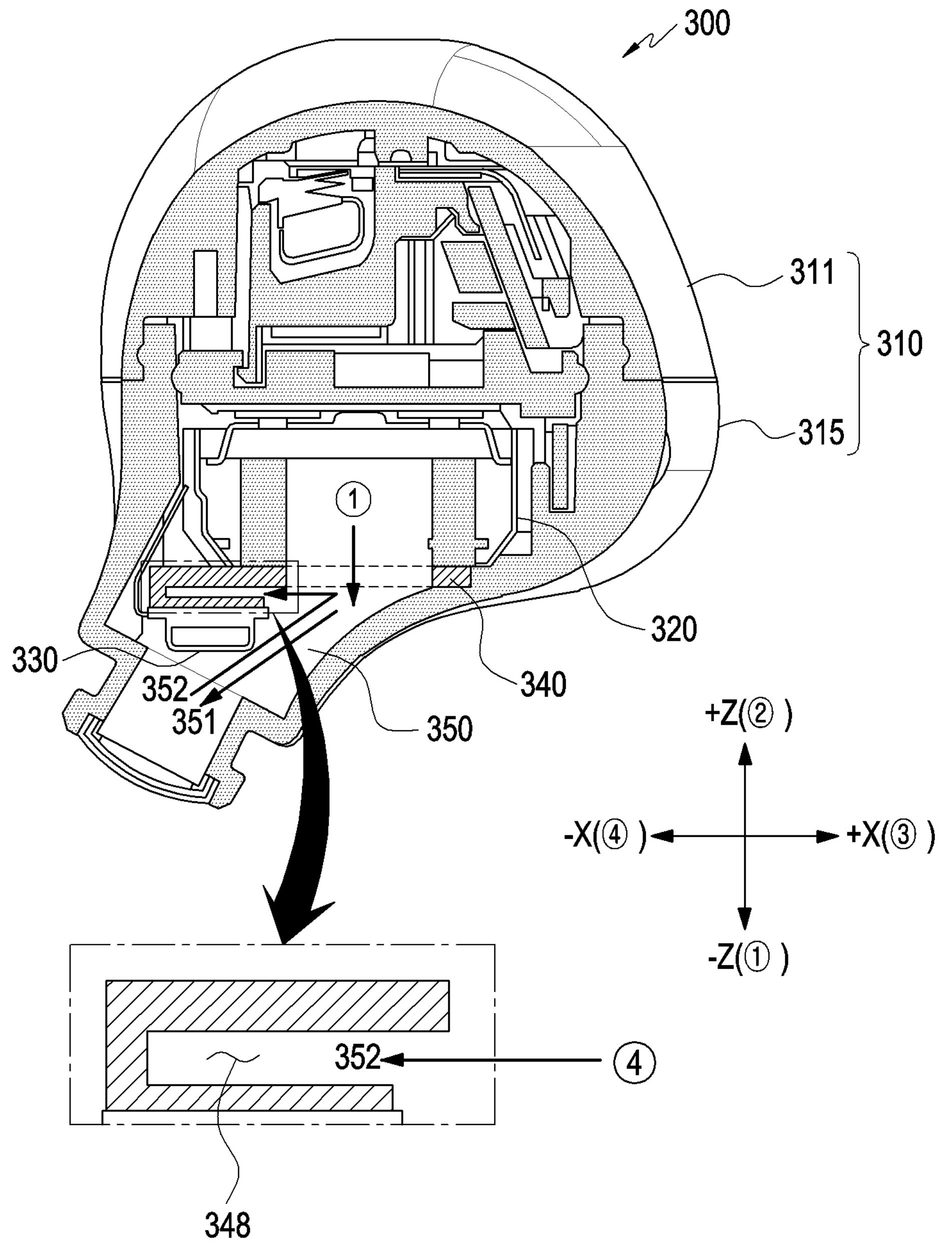
FIG. 4 is a cross-sectional view illustrating a housing according to an embodiment of the disclosure.
Figure 5:
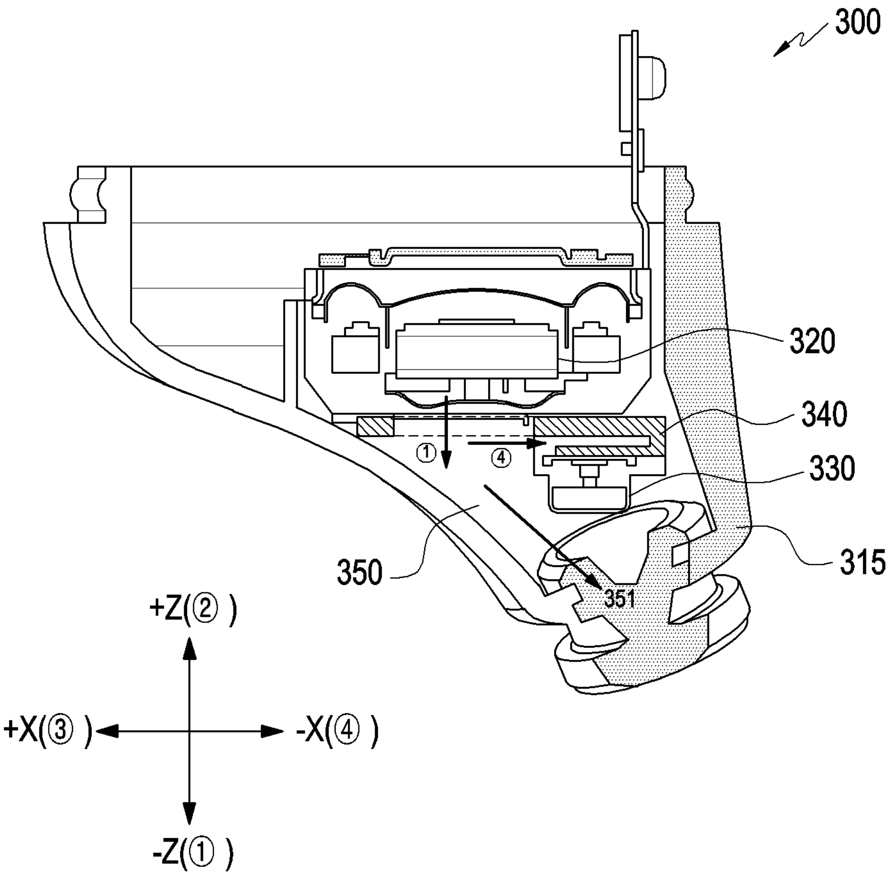
FIG. 5 is a cross-sectional view illustrating a second housing according to an embodiment of the disclosure.
Figure 6A:
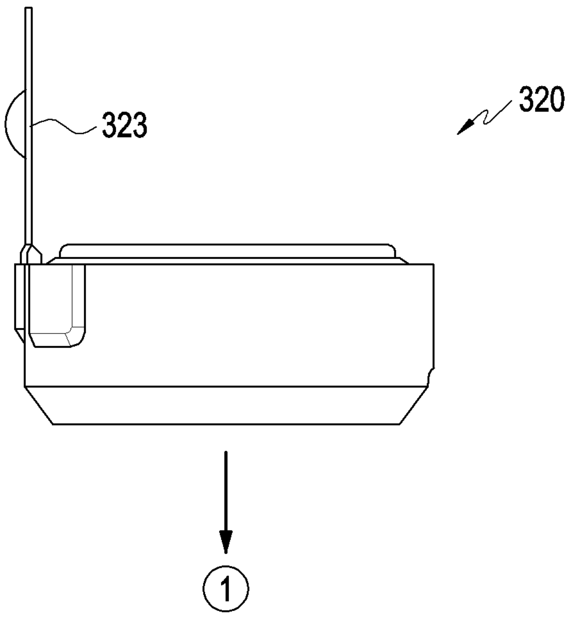
FIG. 6A is a side view illustrating a speaker module according to an embodiment of the disclosure.
Figure 6B:
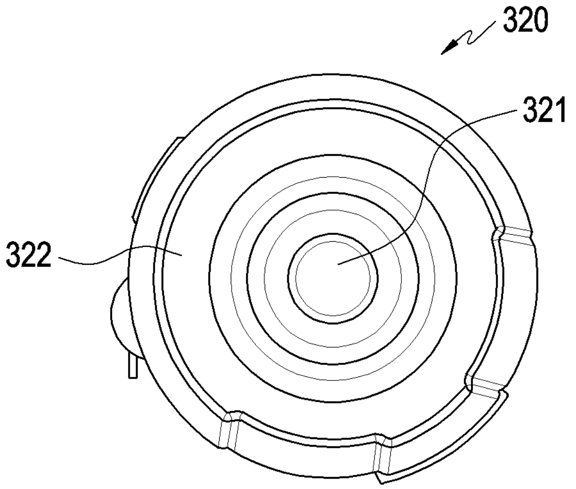
FIG. 6B is a diagram illustrating a bottom surface of a speaker module according to an embodiment of the disclosure.
Figure 6C:
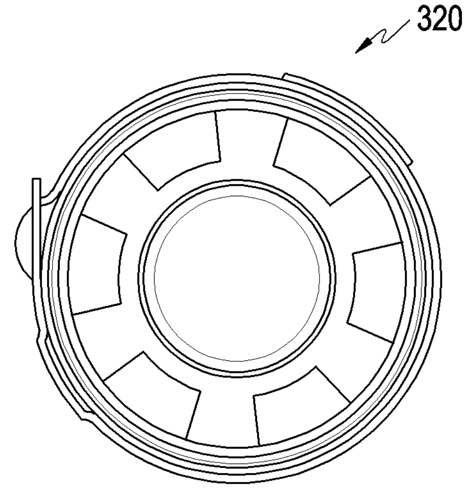
FIG. 6C is a diagram illustrating a top surface of a speaker module according to an embodiment of the disclosure.
Figure 7A:
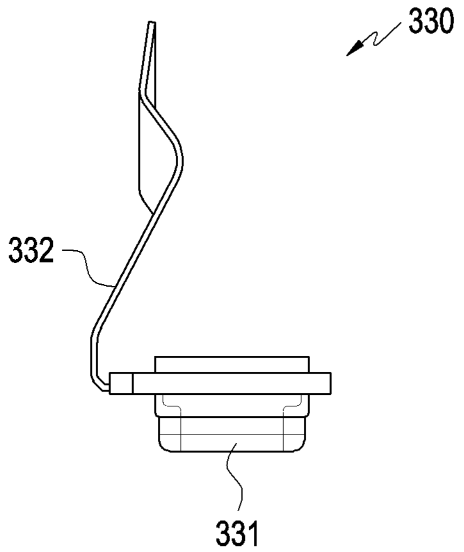
FIG. 7A is a side view illustrating a microphone module according to an embodiment of the disclosure.
Figure 7B:
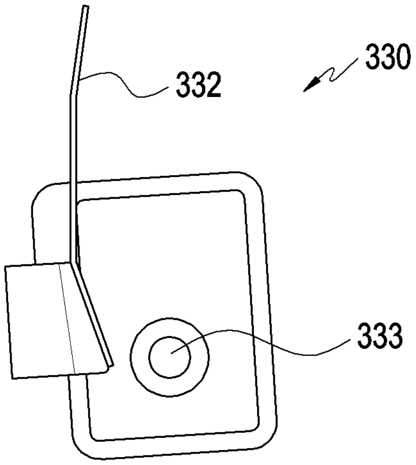
FIG. 7B is a diagram illustrating a bottom surface of a microphone module according to an embodiment of the disclosure.
Figure 7C:
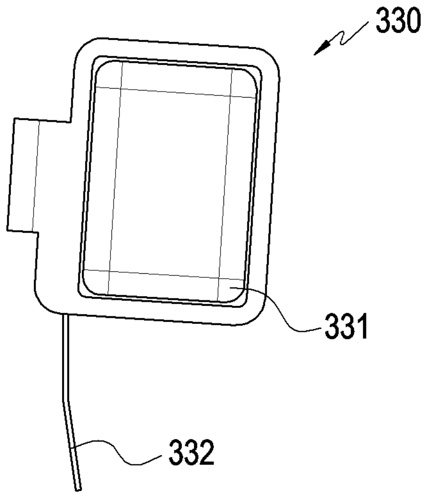
FIG. 7C is a diagram illustrating a top surface of a microphone module according to an embodiment of the disclosure.

FIG. 4 is a diagram illustrating a cross-section of a housing according to an embodiment of the disclosure. FIG. 5 is a cross-sectional view illustrating a second housing according to an embodiment of the disclosure. FIG. 6A is a side view illustrating a speaker module in accordance with an embodiment of the disclosure. FIG. 6B is a diagram illustrating a bottom surface of a speaker module according to an embodiment of the disclosure. FIG. 6C is a diagram illustrating a top surface of a speaker module according to an embodiment of the disclosure. FIG. 7A is a side view illustrating a microphone module according to an embodiment of the disclosure. FIG. 7B is a diagram illustrating a bottom surface of a microphone module according to an embodiment of the disclosure. FIG. 7C is a diagram illustrating a top surface of a microphone module according to an embodiment of the disclosure.

According to various embodiments, referring to FIGS. 4 and 7C, the electronic device 300 may include the housing 310, the speaker module 320, the microphone module 330, a support member 340, and a conduit 350. According to various embodiments, the speaker module 320, the microphone module 330, the support member 340, and the conduit 350 may be disposed inside the second housing 315. The configurations of the electronic device 300, the housing 310, the speaker module 320, and the microphone module 330 in FIGS. 4 to 7C may be wholly or partially identical to those of the electronic device 101, the housing 310, the audio module 170, and the input module 150 in FIGS. 1 and 2.

Referring to FIGS. 4 and 5, 'X' may represent a longitudinal direction of the electronic device 300. 'Z' may represent a thickness direction of the electronic device 300. In addition, in an embodiment of the disclosure, '+X' may represent a right direction (third direction ③) of the electronic device, and '−X' may represent a left direction (fourth direction ④) of the electronic device. In an embodiment of the disclosure, '+Z' may represent an upward direction (second direction ②) of the electronic device, and '−Z' may represent a downward direction (first direction ①) of the electronic device.

According to various embodiments, the speaker module 320 may be disposed inside the housing 310. According to an embodiment, the speaker module 320 may be disposed inside the second housing 315. According to various embodiments, the speaker module 320 may include a sound output unit 321 that generates a sound, a speaker housing 322 formed to surround the sound output unit 321, a speaker flexible printed circuit board (FPCB) 323, a diaphragm (not shown), and a coil (not shown). According to an embodiment, the speaker module 320 may be substantially cylindrical. At least part of the sound output unit 321 and the speaker housing 322 may form one surface facing in the first direction ① of the speaker module 320. At least part of the one surface facing in the first direction ① of the speaker module 320 may contact the support member 340 to be described later. According to an embodiment, a sound generated from the speaker module 320 may be output in the first direction ① through the sound output unit 321.

According to various embodiments, the conduit 350 may be disposed to be coupled to one surface of the sound output unit 321 facing in the first direction ①. The conduit 350 may provide a path so that a sound output from the speaker module 320 may be output to the outside of the electronic device 300 through at least one opening formed in the housing 310. According to an embodiment, the conduit 350 may be formed of at least one of a metal material, a polymer material, or a ceramic material. According to an embodiment, the conduit 350 may include at least one opening and a foreign material prevention member that prevents introduction of a foreign material (e.g., dust or moisture). According to various embodiments, the speaker module 320 may generate a sound in the first direction ①), and the generated sound may be transmitted to the outside of the electronic device 300 through a first path 351 along the inside of the conduit 350.

According to various embodiments, the microphone module 330 may be disposed inside the housing 310. According to an embodiment, the microphone module 330 may be disposed inside the second housing 315.

According to various embodiments, the microphone module 330 is an electronic component that collects an external sound signal that has entered the housing 310, and at least one microphone module 330 may be disposed in the housing 310. According to various embodiments, the microphone module 330 may include a microphone 331, a microphone FPCB 332, and a third microphone hole 333 formed in the microphone FPCB 332. The microphone FPCB 332 of the microphone module 330 may be electrically coupled to the speaker FPCB 323. For example, the microphone 331 may be a feedback microphone. When the electronic device 300 performs an active noise cancellation (ANC) operation, the feedback microphone may be a microphone for cancelling external noise by comparing a sound output from the speaker module 320 of the electronic device 300 with a sound from the outside of the electronic device 300.

In a general electronic device, the area of a conduit is large or the size of a microphone is small, so that the microphone may be inserted into the conduit. However, as the size of the conduit 350 decreases and a high-performance microphone 331 is used for wearability and aesthetics over the recent years, the size of the microphone 331 may increase. As the size of the conduit 350 decreases and the size of the microphone 331 increases, when the microphone 331 is disposed in the conduit 350, the microphone 331 may occupy most of the internal space of the conduit 350, thereby degrading audio performance. Due to the limited internal space of the conduit, a sound reception path into the microphone and a sound output path of the speaker may not be differently configured, and thus audio (e.g., microphone) performance may be degraded. According to various embodiments of the disclosure, in response to the changed sizes of the conduit 350 and the microphone 331, the microphone module 330 may be disposed at a location spaced apart from the speaker module 320 and/or the conduit 350. For example, the support member 340 may be located between the microphone module 330 and the speaker module 320. For example, the microphone module

330 may be disposed at a position that does not interfere with a space in which the conduit 350 is disposed. The microphone module 330 may be spaced apart from the conduit 350 to secure an opening ratio of the conduit 350 and prevent degradation of audio performance.

According to various embodiments, the support member 340 may spatially separate the speaker module 320 and the microphone module 330 from each other. For example, the speaker module 320 may be located on the support member 340, and the microphone module 330 may be located under the support member 340 in the second housing 315. A detailed description will be given later of the shape, structure, and function of the support member 340.

Figure 8A:
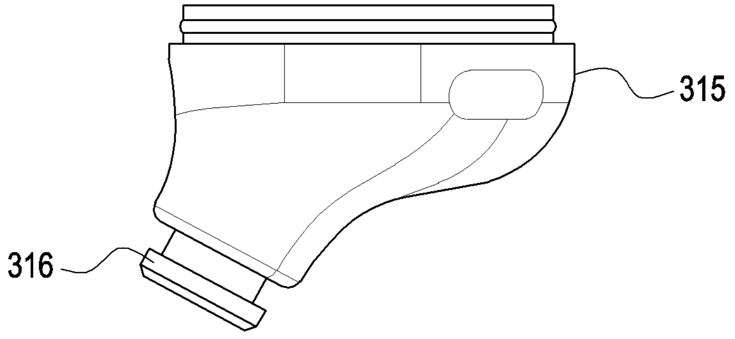
FIG. 8A is a side view illustrating a second housing according to an embodiment of the disclosure.
Figure 8B:
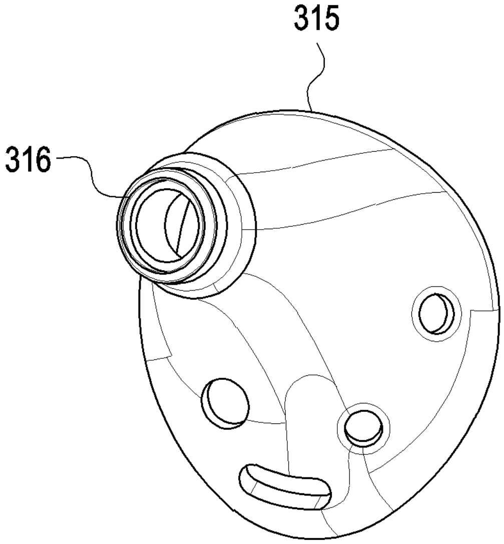
FIG. 8B is a perspective view illustrating a second housing, according to an embodiment of the disclosure.
Figure 8C:
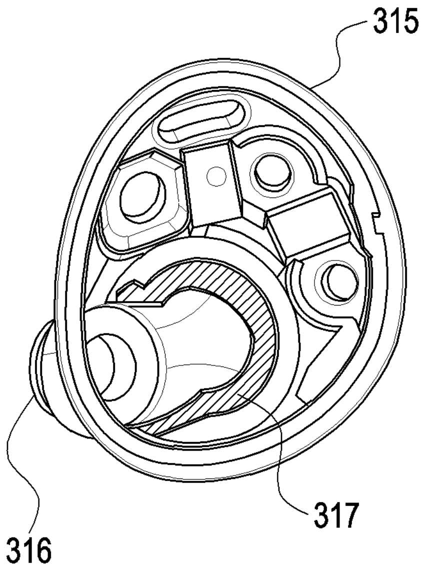
FIG. 8C is a diagram illustrating a support member mounting surface inside a second housing according to an embodiment of the disclosure.
Figure 9A:
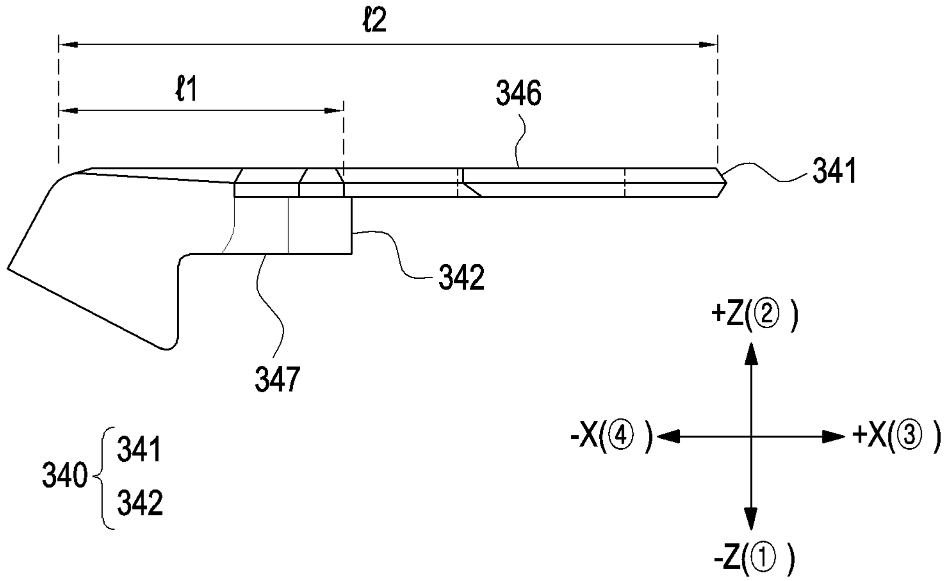
FIG. 9A is a side view illustrating a support member according to an embodiment of the disclosure.
Figure 9B:
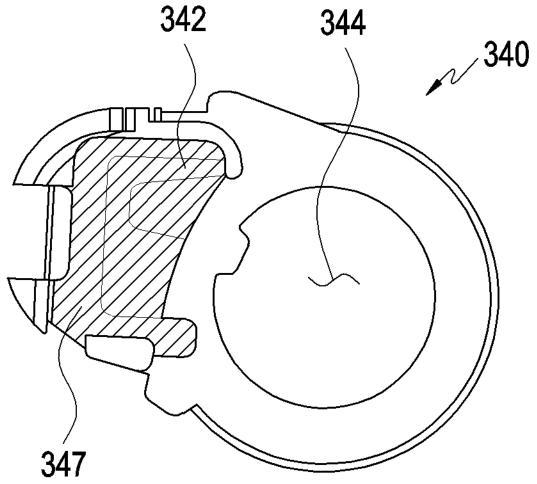
FIG. 9B is a plan view illustrating a bottom surface of a support member according to an embodiment of the disclosure.
Figure 9C:
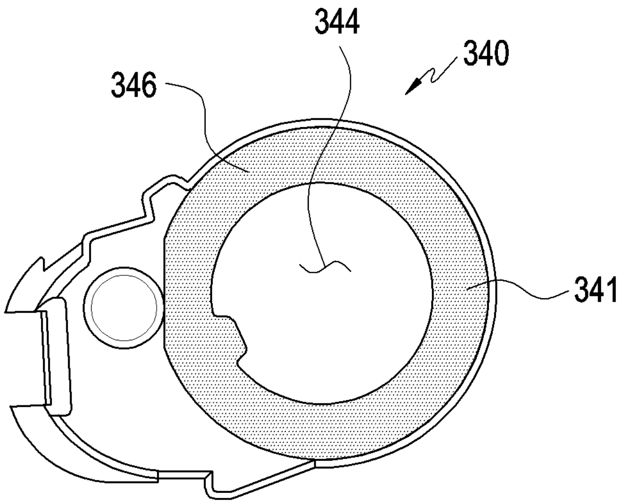
FIG. 9C is a plan view illustrating a top surface of a support member according to an embodiment of the disclosure.
Figure 9D:
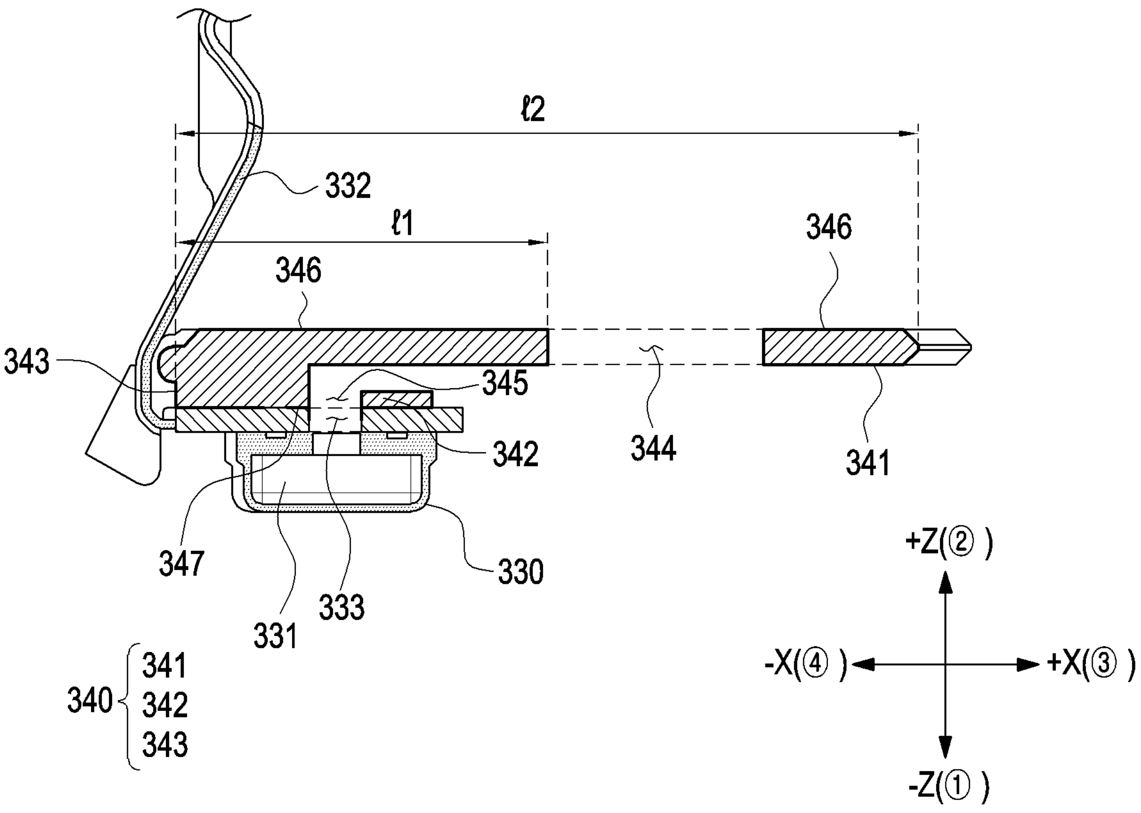
FIG. 9D is a diagram illustrating a cross-section of a support member and a microphone module coupled with the support member according to an embodiment of the disclosure.
Figure 10:
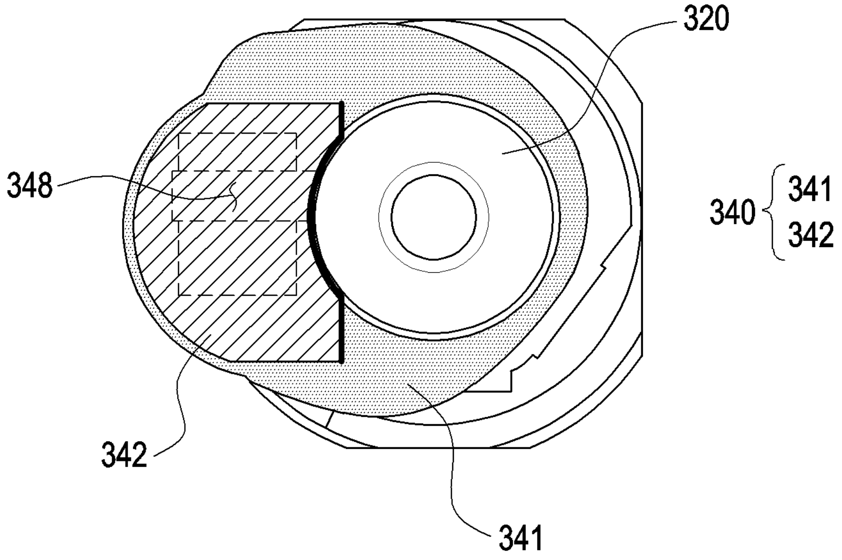
FIG. 10 is a diagram illustrating a support member coupled with a speaker module, viewed from below the support member, according to an embodiment of the disclosure.

FIG. 8A is a side view illustrating a second housing according to an embodiment of the disclosure. FIG. 8B is a perspective view illustrating a second housing according to an embodiment of the disclosure. FIG. 8C is a diagram illustrating a support member mounting surface inside a second housing according to an embodiment of the disclosure. FIG. 9A is a side view illustrating a support member according to an embodiment of the disclosure. FIG. 9B is a plan view illustrating a bottom surface of a support member according to an embodiment of the disclosure. FIG. 9C is a plan view illustrating a top surface of a support member according to an embodiment of the disclosure. FIG. 9D is a diagram illustrating a cross-section of a support member and a microphone module coupled to a support member according to an embodiment of the disclosure. FIG. 10 is a diagram illustrating a support member coupled with a speaker module, viewed from below the support member, according to an embodiment of the disclosure.

According to various embodiments, referring to FIGS. 8A to 10, the electronic device 300 may include the housing 310, the speaker module 320, the microphone module 330, the support member 340, and the conduit 350. The configurations of the electronic device 300, the housing 310, the speaker module 320, the microphone module 330, the support member 340, and the conduit 350 in FIGS. 8A to 10 may be wholly or partially identical to those of the electronic and electronic device 300, the housing 310, the speaker module 320, the microphone module 330, the support member 340, and the conduit 350 in FIGS. 4 and 5.

Referring to FIGS. 8A to 10, 'X' may represent the longitudinal direction of the electronic device 300. 'Z' may represent the thickness direction of the electronic device 300. In addition, in an embodiment of the disclosure, '+X' may represent the right direction (third direction ③) of the electronic device, and '−X' may represent the left direction (fourth direction ④) of the electronic device. In an embodiment of the disclosure, '+Z' may represent the upward direction (second direction ②) of the electronic device, and '−Z' may represent the downward direction (first direction ①) of the electronic device.

According to various embodiments, the support member 340 that supports the microphone module 330 or the speaker module 320 in the electronic device 300 may be disposed on the support member mounting surface 317 formed in the second housing 315.

According to various embodiments, the support member 340 may include a material such as PC and/or SUS. However, the material of the support member 340 is not limited these materials, and various materials may be used for the support member 340 according to the thickness of the electronic device 300.

According to various embodiments, the support member 340 may include a speaker support section 341, a microphone support section 342, and a coupling section 343. The speaker support section 341, the microphone support section 342, and the coupling section 343 may be integrally formed. While a microphone support section and a speaker support section are formed separately in a general electronic device, the microphone support section 342 and the speaker support section 341 may be integrated to reduce the overall thickness of the electronic device 300 according to an embodiment of the disclosure. In addition, the audio performance may be improved by securing the opening ratio of the conduit 350. In addition, sound leakage into the microphone may be reduced. According to various embodiments, the speaker support section 341 may be located on the coupling section 343, and the microphone support section 342 may be located under the coupling section 343. For example, the support member 340 may be formed in a '⊂' shape.

According to various embodiments, the speaker module 320 may be disposed on a first surface 346 of the speaker support section 341 facing in the upward direction. The microphone module 330 may be disposed on a second surface 347 of the microphone support section 342 facing in the downward direction opposite to the first surface 346.

According to various embodiments, the speaker support section 341 of the support member 340 may further include a speaker hole 344. The first surface 346 of the speaker support section 341 facing in the second direction ② may correspond to at least part of the speaker housing 322 forming one surface of the speaker module 320 facing in the first direction ①. The speaker hole 344 of the speaker support section 341 may correspond to the sound output unit 321 of the speaker module 320.

According to various embodiments, the microphone support section 342 of the support member 340 may further include a fourth microphone hole 345. The second surface 347 of the microphone support section 342 facing in the first direction ① may correspond to one surface of the microphone module 330 facing in the first direction ①. At least parts of the second surface 347 of the microphone support section 342 and one surface of the microphone module 330 facing in the first direction ① may include a concavo-convex portion. For example, the at least parts may be concave and convex, respectively. According to various embodiments, the microphone support section 342 of the support member 340 may be formed to extend from one end of the support member 340 in the third direction ③ perpendicular to the first direction ① by a first length 11. The speaker support section 341 of the support member 340 may be formed to extend from the one end of the support member 340 in the third direction ③ by a second length 12. The second length 12 may be greater than the first length 11. The speaker hole 344 formed in the support member 340 may be formed at a point extending from the one end of the support member 340 in the third direction ③ by more than the first length 11.

According to various embodiments, to secure the opening ratio of the conduit 350 and prevent degradation of audio performance, the microphone support section 342 may not overlap with the speaker hole 344 in the longitudinal direction (e.g., the X-axis direction of FIG. 9A). For example, the microphone support section 342 may be disposed to avoid the speaker hole 344.

According to an embodiment, at least part of the microphone support section 342 may be concave in a shape corresponding to the shape of the speaker support section 341. The microphone support section 342 includes a speaker hole 344 and a speaker support section 341. Only part of the microphone 331 may be mounted in the microphone support section 342 by cutting off a portion of the microphone support section 342 interfering with the microphone 331 and the speaker support section 341. For example, at least part of the microphone support section 342 may be configured not to overlap with the part of the speaker hole 344. The thickness of the electronic device 300 may be reduced by reducing the unnecessary area.

According to various embodiments, the support member 340 may form a first space 348 between the microphone support section 342 and the speaker support section 341. The first space 348 may be a duct extending in the longitudinal direction (e.g., the X-axis direction of FIG. 9D). For example, a sound from the outside of the electronic device 300 may be introduced into the electronic device 300 through the conduit 350, move in a second path (e.g. 352 of FIG. 4) along the first space 348 inside the duct in the fourth direction ④ perpendicular to the first direction ①, and enter the microphone 331 through the second microphone hole 314 formed in the microphone support section 342. For example, the microphone module 330 may receive a sound laterally along the second path 352 inside the duct. For example, a sound output path (e.g., the first path 351 of FIG. 4) of the speaker module 320 and a sound reception path (e.g., the second path 352 of FIG. 4) of the microphone module 330 may be different. For example, the sound output path (e.g., the first path 351 of FIG. 4) of the speaker module 320 and the sound reception path (e.g., the second path 352 of FIG. 4) of the microphone module 330 may be perpendicular to each other.

According to various embodiments, a sound output from the speaker module 320 may not be directly introduced into the microphone module 330 by being blocked by the speaker support section 341. For example, the speaker support section 341 may serve as a barrier that blocks the sound output from the speaker module 320 from being directly introduced into the microphone module 330. According to an embodiment, the microphone module 330 may receive the sound only along the second path 352 inside the duct.

According to various embodiments of the disclosure, an electronic device (e.g., the electronic device 300 of FIG. 4) may include: a housing (e.g., the housing 310 of FIG. 4); a speaker module (e.g., the speaker module 320 of FIG. 4) disposed inside the housing; a microphone module (e.g., the microphone module 330 of FIG. 4) disposed inside the housing; and a support member (e.g., the support member 340 of FIG. 9D) including a speaker hole (e.g., the speaker hole 344 of FIG. 9D), a speaker support section (e.g., the speaker support section 341 of FIG. 9D) having the speaker module disposed on a first surface (e.g., the first surface 346 of FIG. 9D) thereof, and a microphone support section (e.g., the microphone support section 342 of FIG. 9D) having the microphone module disposed on a second surface (e.g., the second surface 347 of FIG. 9D) thereof opposite to the first surface. The microphone module may be disposed to be spaced apart from the speaker hole.

According to various embodiments, the speaker support section and the microphone support section may be integrally formed.

According to various embodiments, the support member may further include a coupling section coupling the speaker support section and the microphone support section to each other.

According to various embodiments, the speaker module may include a sound output unit (e.g., the sound output unit 321 of FIG. 6B) generating a sound, and a speaker housing (e.g., the speaker housing 322 of FIG. 6B) formed to surround the sound output unit.

According to various embodiments, the sound generated by the speaker module may be output in a first direction through the sound output unit.

According to various embodiments, the electronic device may further include a conduit disposed adjacent to the sound output unit, and the microphone module may be spatially separated from the conduit.

According to various embodiments, the sound output in the first direction may be directed to an outside of the electronic device through a first path (e.g., the first path 351 of FIG. 4) along an inside of the conduit disposed adjacent to the sound output unit.

According to various embodiments, the support member may spatially separate the speaker module and the microphone module from each other.

According to various embodiments, the support member may further include a coupling section coupling the speaker support section and the microphone support section to each other. The microphone support section may be formed to extend from the coupling section by a first length in a third direction perpendicular to the first direction, the speaker support section may be formed to extend from the coupling section by a second length greater than the first length in the third direction, and the speaker hole may be formed in a portion extending from one end of the support member by more than the first length in the third direction.

According to various embodiments, the microphone support section may be disposed not to overlap with the speaker hole, when viewed from above the electronic device.

According to various embodiments, at least part of the microphone support section may be formed to be concave in a shape corresponding to a shape of the speaker support section.

According to various embodiments, the speaker support section and the microphone support section do not overlap with each other.

According to various embodiments, a first space (e.g., the first space 348 of FIG. 4) may be formed between at least part of the speaker support section and the microphone support section.

According to various embodiments, when a sound from the outside of the electronic device is introduced into the electronic device, the sound may move along the first space in a fourth direction perpendicular to the first direction.

According to various embodiments, a sound output direction of the speaker module and a sound reception direction of the microphone module may be different.

According to various embodiments, the speaker support section may spatially separate the microphone module and the speaker module from each other.

According to various embodiments, the housing may be worn on an outside part of a user's ear.

According to various embodiments of the disclosure, the electronic device 300 may include: a housing; a speaker module disposed inside the housing and formed to output a sound in a first direction; a microphone module disposed inside the housing and formed to receive a sound in a fourth direction perpendicular to the first direction; and a support member including a speaker hole, a speaker support section having the speaker module disposed on a first surface thereof, a microphone support section having the microphone module disposed on a second surface thereof opposite to the first surface, and a coupling section coupling the speaker support section and the microphone support section to each other. The microphone support section may be disposed to be spaced apart from the speaker hole.

According to various embodiments, the speaker support section and the microphone support section may be integrally formed.

According to various embodiments, a first space may be formed between at least part of the speaker support section and the microphone support section.

The above-described electronic device according to various embodiments of the disclosure is not limited by the foregoing embodiments and the drawings, and it will be apparent to those skilled in the art that many replacements, variations, and modifications can be made within the technical scope of the disclosure.

What is claimed is:

1. An electronic device comprising:
- a housing;
- a speaker module disposed inside the housing and comprising a sound output unit configured to output a sound in a first direction;
- a microphone module disposed inside the housing; and
- a support member including a coupling section, a speaker support section extending from the coupling section in a third direction perpendicular to the first direction and including a speaker hole and a first surface, on which the speaker module is disposed, facing in a second direction opposite to the first direction, and a microphone support section extending from the coupling section in the third direction and including a microphone hole and a second surface, on which the microphone module is disposed, facing in the first direction,
- wherein the microphone module is disposed to be spaced apart from the speaker hole,
- wherein a first space is a duct formed between the microphone support section and the speaker support section, and
- wherein the microphone module is configured to receive a sound introduced from outside of the electronic device through the duct.

2. The electronic device of claim 1, wherein the speaker support section and the microphone support section are integrally formed.

3. The electronic device of claim 1, wherein the support member further includes a coupling section coupling the speaker support section and the microphone support section to each other.

4. The electronic device of claim 1, wherein the speaker module a speaker housing formed to surround the sound output unit.

5. The electronic device of claim 1, further comprising:
- a conduit disposed adjacent to the sound output unit,
- wherein the microphone module is spatially separated from the conduit.

6. The electronic device of claim 5, wherein the sound output in the first direction is directed to outside of the electronic device through a first path along an inside of the conduit disposed adjacent to the sound output unit.

7. The electronic device of claim 1, wherein the support member spatially separates the speaker module and the microphone module from each other.

8. The electronic device of claim 1,
- wherein the microphone support section is formed to extend from the coupling section by a first length in the third direction, and
- wherein the speaker support section is formed to extend from the coupling section by a second length greater than the first length in the third direction.

9. The electronic device of claim 1, wherein the microphone support section is disposed not to overlap with the speaker hole, when viewed from the second direction.

10. The electronic device of claim 1, wherein at least part of the microphone support section is formed to be concave in a shape corresponding to a shape of the speaker support section.

11. The electronic device of claim 1, wherein when the sound from the outside of the electronic device is introduced into the electronic device, the sound moves along the first space in a fourth direction perpendicular to the first direction.

12. The electronic device of claim 1, wherein a sound output direction of the speaker module and a sound reception direction of the microphone module are different.

13. The electronic device of claim 1, wherein the speaker support section spatially separates the microphone module and the speaker module from each other.

14. The electronic device of claim 1, wherein the housing is configured to be worn on an outside part of a user's ear.

* * * * *